(12) United States Patent
Hu

(10) Patent No.: US 7,718,151 B1
(45) Date of Patent: May 18, 2010

(54) METHODS AND SYSTEMS FOR DEACIDIZING GASEOUS MIXTURES

(76) Inventor: Liang Hu, 297 Creek Ave., Hampton, VA (US) 23669

( * ) Notice: Subject to any disclaimer, the term of this patent is extended or adjusted under 35 U.S.C. 154(b) by 0 days.

(21) Appl. No.: 12/250,257

(22) Filed: Oct. 13, 2008

Related U.S. Application Data

(63) Continuation-in-part of application No. 11/279,095, filed on Apr. 7, 2006, now Pat. No. 7,541,011.

(51) Int. Cl.
| | |
|---|---|
| *B01D 53/48* | (2006.01) |
| *B01D 53/50* | (2006.01) |
| *B01D 53/52* | (2006.01) |
| *B01D 53/62* | (2006.01) |
| *B01D 53/68* | (2006.01) |

(52) U.S. Cl. ............... 423/220; 423/226; 423/228; 423/234; 423/242.1; 423/242.2; 423/242.7; 423/243.01; 423/243.06; 423/243.08; 423/243.11; 423/243.12; 423/240 R

(58) Field of Classification Search ............ 423/220, 423/226, 228, 234, 242.1, 242.2, 242.7, 243.01, 423/243.06, 243.08, 243.11, 243.12, 240 R
See application file for complete search history.

(56) References Cited

U.S. PATENT DOCUMENTS 6,969,418 B1   11/2005  Hu 7,541,011 B2 *  6/2009  Hu ........................ 423/220
2007/0286783 A1   12/2007  Carrette et al.

OTHER PUBLICATIONS

Howard Herxog et al.; Co2 Capture, Reuse and Storage Technologies for Mitigating Global Climate Change; DOE Order No. DE-AF-22-96PC01257; Jan. 1997; 70 pages; Cambridge, MA, US.
James T. Yeh et al.; Semi-batch Absorption and Regeneration Studies for Co2 Capture by Aqueous Ammonia; Fuel Processing Technology 86 (2005); pp. 1533-1546; Pittsburgh, PA US.
Kevin P. Resnik et al.; Aqua Ammonia Process for Simultaneous Removal of Co2, So2, and NOx; International Journal of Environmental Technology and Management vol. 4, Nos. 1/2, 2004; 19 pages; US.
Dr. R.H. Niswander et al.; A More Energy Efficient Product for Carbon Dioxide Separation; Separation Science and Technology, 28(1-3); 1993; pp. 565-578; Freeport, TX, US.
Amormvadee Veawab et al.; Solvent Formulation for Co2 Separation from Flue Gas Steams; 9 pages; Regina, SK, Canada, May 2001.

* cited by examiner

*Primary Examiner*—Timothy C Vanoy
(74) *Attorney, Agent, or Firm*—Panitch Schwarze Belisario & Nadel LLP

(57) ABSTRACT

An improved process for deacidizing a gaseous mixture using phase enhanced gas-liquid absorption is described. The process utilizes a multiphasic absorbent that absorbs an acid gas at increased rate and leads to reduced overall energy costs for the deacidizing operation.

21 Claims, 2 Drawing Sheets

METHODS AND SYSTEMS FOR DEACIDIZING GASEOUS MIXTURES

REFERENCE TO RELATED APPLICATIONS

This application is a continuation-in-part patent application of U.S. patent application Ser. No. 11/279,095, filed on Apr. 7, 2006, issued as U.S. Pat. No. 7,541,011 on Jun. 2, 2009, titled "Phase Transitional Absorption Method," which is hereby incorporated by reference herein in its entirety.

STATEMENT OF GOVERNMENT LICENSE RIGHTS

The U.S. Government has a paid-up license in this invention and the right in limited circumstances to require the patent owner to license others on reasonable terms as provided for by the terms of Grant Nos. DE-FG26-02NT41668; DE-FG26-04NT42128; and DE-FG26-05NT42488 awarded by the United States Department of Energy.

FIELD OF THE INVENTION

The present invention relates to a process for deacidizing a gaseous mixture using phase enhanced gas-liquid absorption. More particularly, the present invention relates to a process for deacidizing a gaseous mixture using phase enhanced gas-liquid absorption, which increases the absorption fate of an acid gas from the gaseous mixture and reduces the overall energy costs for such deacidizing operation.

BACKGROUND OF THE INVENTION

Deacidization is required before a raw natural gas or any other gaseous mixture that contains significant amounts of acid gas, such as hydrogen sulfide ($H_2S$), carbon dioxide ($CO_2$), or similar contaminants, can be utilized. The deacidization process reduces the acid gas impurity in the gaseous mixture to acceptable levels. This is commonly done with an amine gas treatment process. Amine gas treatment processes are common in various types of industrial settings, such as refineries, natural gas processing plants, and petrochemical plants. Amine gas treatment processes include the processes utilizing aqueous solutions of amines to remove acid gas, such as $H_2S$ and $CO_2$, from natural gases.

A common deacidization process is gas-liquid absorption. Such process typically involves contacting a gaseous mixture containing an acid gas to be removed with an aqueous amine solution, whereby the amine solution is an absorbent that absorbs the acid gas. In industrial settings, the most commonly used amines are alkanolamines, such as monoethanolamine (MEA) and diethanolamine (DEA). The use of the alkanolamine methyldiethanolamine (MDEA) for $CO_2$ separation has recently become notable for use in industrial settings. Diisopropanolamine (DIPA) is currently used in the Sulfinol process and in the SCOT process for Claus plant tail acid gas purification.

In the typical gas-liquid absorption process, after the acid gas is absorbed into the absorbent in an absorption unit, the gas-rich absorbent is sent to a regeneration unit, where the gas-rich absorbent is treated and separated to regenerate the absorbed gas and the gas-lean absorbent. The regenerated gas-lean absorbent is then recycled back into the absorption unit and the acid gas is either collected or discharged, depending on the purpose of the user. In this type of gas-liquid absorption, the regeneration process accounts for greater than 80% of the total energy costs because the entire volume of the absorbent effluent must be regenerated in order to be reused in the absorption unit. In addition, the typical gas-liquid absorption process is limited to the use of an absorbent in the form of one liquid phase.

BRIEF SUMMARY OF THE INVENTION

It is now discovered that a method for deacidizing a gaseous mixture involving phase enhanced gas-liquid absorption increases the absorption rate of an acid gas from the gaseous mixture and reduces the overall energy costs for such deacidizing operation.

In one general aspect, embodiments of the present invention relate to a method for deacidizing a gaseous mixture comprising an acid gas. The method comprises:

contacting the gaseous mixture with an absorbent in an absorption unit, wherein the absorbent comprises a carrier phase and an organic phase that is immiscible with the carrier phase;

allowing the organic phase to absorb the acid gas and convert the acid gas into an absorbed acid gas, so as to convert the absorbent into a gas-rich absorbent and to convert the gaseous mixture into a purified gaseous mixture;

allowing the absorbed acid gas to be transferred into the carrier phase, so as to form a first gas-lean phase and a gas-rich phase in the gas-rich absorbent;

providing the gas-rich absorbent to a separation unit, so as to separate the first gas-lean phase from the gas-rich phase;

cycling the separated first gas-lean phase back into the absorption unit;

providing the separated gas-rich phase to a regeneration unit, so as to obtain the acid gas and a second gas-lean phase; and cycling the second gas-lean phase back into the absorption unit.

In an embodiment of the present invention, the gas-rich absorbent moves downward from the absorption unit to the separation unit by gravity, and the separated gas-rich phase moves downward from the separation unit to the regeneration unit by gravity.

In another general aspect, embodiments of the present invention relates to a system for deacidizing a gaseous mixture comprising an acid gas. The system comprises:

an absorption unit adapted to allow contact between the gaseous mixture and an absorbent comprising a carrier phase and an organic phase that is immiscible with the carrier phase, wherein the organic phase absorbs the acid gas and converts the acid gas into an absorbed acid gas, so as to convert the absorbent into a gas-rich absorbent and to convert the gaseous mixture into a purified gaseous mixture; and wherein the absorbed acid gas is transferred into the carrier phase, so as to form a first gas-lean phase and a gas-rich phase in the gas-rich absorbent;

a separation unit adapted to allow separation of the gas-rich absorbent into a separated first gas-lean phase and a separated gas-rich phase; and a regeneration unit adapted to allow regeneration of the separated gas-rich phase, so as to obtain the acid gas and a second gas-lean phase.

In an embodiment of the present invention, the absorption unit, the separation unit and the regeneration unit are in a single tower, wherein the separation unit is placed in a position lower than the absorption unit and the regeneration unit is placed in a position lower than the separation unit, so that the gas-rich absorbent moves downward from the absorption unit to the separation unit by gravity, and the separated gas-rich phase moves downward from the separation unit to the regeneration unit by gravity.

Other aspects, features and advantages of the invention will be apparent from the following disclosure, including the detailed description of the invention and its preferred embodiments and the appended claims.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
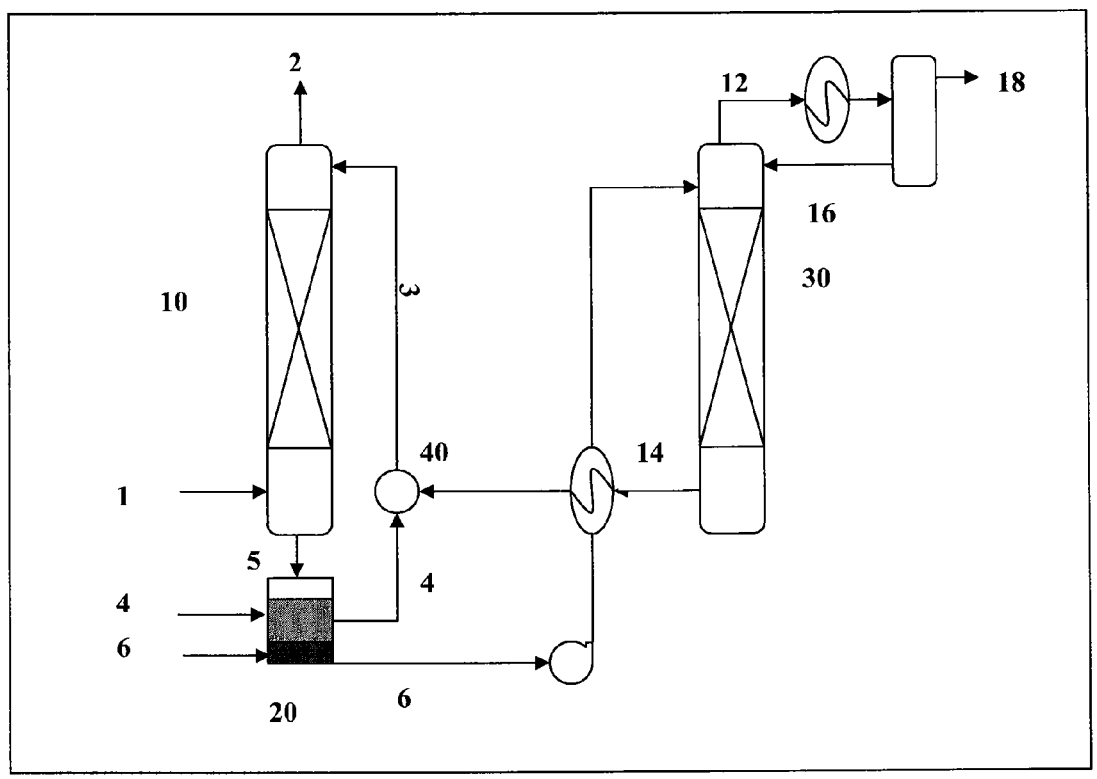
FIG. 1 is a flow diagram showing the steps of the deacidization process according to an embodiment of the present invention.

Unless defined otherwise, all technical and scientific terms used herein have the same meaning as commonly understood to one of ordinary skill in the art to which this invention pertains. Otherwise, certain terms used herein have the meanings as set in the specification. All patents, published patent applications and publications cited herein are incorporated by reference as if set forth fully herein. It must be noted that as used herein and in the appended claims, the singular forms "a," "an," and "the" include plural reference unless the context clearly dictates otherwise.

In one general aspect, the present invention relates to a process of deacidizing a gaseous mixture using a phase enhanced gas-liquid absorption, while minimizing energy costs and maximizing absorption rates.

The concept of phase enhanced gas-liquid absorption is initially described in U.S. Pat. No. 6,969,418, the entirety of which is herein incorporated by reference. It was found that by adding an organic compound or mixture into a gas-liquid (frequently, an aqueous phase) absorption system, the absorption rate of a particular gas can increase significantly. In phase enhanced gas-liquid absorption, more than one phase is involved in absorbing a gas. One of the phases absorbs the gas and transfers the absorbed gas to another phase, that serves as a carrier phase where the absorbed gas is finally accumulated.

According to an embodiment of the present invention, an absorbent and a gaseous mixture containing an acid gas to be removed are contacted in an absorption unit. The absorbent comprises a carrier phase and an organic phase that is immiscible with the carrier phase. As used herein, "an organic phase that is immiscible with the carrier phase" means that the organic phase does not form a solution with the carrier phase at the proportion in the absorbent. In one embodiment of the present invention, the organic phase and the carrier phase have one interface, i.e., the boundary between the two phases, in the absorbent. In another embodiment of the present invention, the organic phase and the carrier phase have multiple interfaces, for example, existing as an emulsion, in the absorbent.

The organic phase serves as a transfer medium that absorbs the acid gas from the gaseous mixture, converts the acid gas into an absorbed acid gas. After the absorption process is complete, the absorbent is converted into a gas-rich absorbent and the gaseous mixture is converted into a purified gaseous mixture that contains none or reduced amount of the acid gas. The purified gaseous mixture can be collected or disposed of depending on the purpose of the user.

The absorbed acid gas is then transferred to the carrier phase, where the absorbed acid gas ultimately accumulates. After the transfer process is complete, a first gas-lean phase and a gas-rich phase are formed in the gas-rich absorbent.

The first gas-lean phase comprises one or more components of the organic phase that do not react with the acid gas. The first gas-lean phase can also contain one or more components of the organic phase that react with the acid gas when the organic phase absorbs the acid gas, but are replaced by one or more components of the carrier phase and thus released from the absorbed acid gas when the absorbed acid gas is transferred to the carrier phase. The first gas-lean phase can further contain one or more components of the carrier phase as a result of the transfer of the absorbed acid gas into the carrier phase.

The gas-rich phase comprises one or more components of the carrier phase. The gas-rich phase can also contain one or more components of the organic phase that react with the acid gas when the organic phase absorbs the acid gas and are not released from the absorbed acid gas when the absorbed acid gas is transferred to the carrier phase. The gas-rich phase can exist as a single liquid phase. The gas-rich phase can also contain multiple phases.

The gas-rich absorbent is provided to a separation unit to separate the first gas-lean phase and the gas-rich phase. The phases can be separated in a separation unit using phase separation methods known to those skilled in the art in view of the present disclosure. For example, the first gas-lean phase and the gas-rich phase can be separated based on the density of the phases, e.g., by a separating drum. The first gas-lean phase and the gas-rich phase can also be separated from each other based on other properties of the phases, e.g., by a membrane that has different permeability to the phases.

In one embodiment of the present invention, the gas-rich absorbent is provided to the separation unit after the transfer of the absorbed acid gas into the carrier phase is complete, thus after the complete formation of the first gas-lean phase and the gas-rich phase.

In another embodiment of the present invention, the gas-rich absorbent is provided to the separation unit before the transfer of the absorbed acid gas into the carrier phase is complete, thus before the complete formation of the first gas-lean phase and the gas-rich phase.

The formation of the first gas-lean phase and the gas-rich phase can proceed before, simultaneously, or after the gas-rich absorbent is provided to the separation unit.

The separated first gas-lean phase is cycled back into the absorption unit for reuse, while the gas-rich phase is routed to a regeneration unit, where the gas-rich phase is treated to produce the regenerated acid gas and a second gas-lean phase. The regenerated acid gas is collected or disposed of depending on the purpose of the user. The gas-rich phase can be regenerated using regeneration methods known to those skilled in the art in view of the present disclosure.

The second gas-lean phase comprises one or more regenerated components of the carrier phase. The second gas-lean phase can also contain one or more regenerated components of the organic phase, for example those react with the acid gas when the organic phase absorbs the acid gas and are not released from the absorbed acid gas when the absorbed acid gas is transferred to the carrier phase. The second gas-lean phase can be a single liquid phase. The second gas-lean phase can also have multiple phases. The second gas-lean phase is cycled back into the absorption unit for reuse.

In an embodiment of the present invention, the various phases are transferred from one unit to another unit by a pump. In other embodiments of the present invention, the various phases are transferred between at least some of the units by gravity.

In an embodiment of the present invention, the gas-rich absorbent moves downward from the absorption unit to the separation unit by gravity.

In another embodiment of the present invention, the separated gas-rich phase moves downward from the separation unit to the regeneration unit by gravity.

In still another embodiment of the present invention, the gas-rich absorbent moves downward from the absorption unit to the separation unit, and the separated gas-rich phase moves downward from the separation unit to the regeneration unit, all by gravity.

In another general aspect, the present invention relates to a system for deacidizing a gaseous mixture comprising an acid gas. The system comprises an absorption unit, a separation unit and a regeneration unit as those described herein.

In an embodiment of the present invention, the separation unit is placed in a position lower than the absorption unit, so that the gas-rich absorbent moves downward from the absorption unit to the separation unit by gravity.

In another embodiment of the present invention, the regeneration unit is placed in a position lower than the separation unit, so that the separated gas-rich phase moves downward from the separation unit to the regeneration unit by gravity.

In still another embodiment of the present invention, the absorption unit, the separation unit and the regeneration unit are placed in a single tower, wherein the separation unit is placed in a position lower than the absorption unit and the regeneration unit is placed in a position lower than the separation unit, so that the gas-rich absorbent moves downward from the absorption unit to the separation unit by gravity, and the separated gas-rich phase moves downward from the separation unit to the regeneration unit by gravity.

The deacidization process according to embodiments of the present invention can be used to remove an impurity acid gas from a gaseous mixture, in which case the impurity acid gas can be disposed of, with improved efficiency. Alternatively, the deacidization process according to embodiments of the present invention can be used to collect an acid gas of interest from a gaseous mixture, with improved efficiency.

In one aspect of the present invention, the utilization of the organic phase in an absorption unit according to an embodiment of the present invention serves to increase the absorption rate of the acid gas. The acid gas is absorbed into the organic phase at a rate greater than if it were directly absorbed by the carrier phase. In another aspect of the present invention, the energy to be expended for the regeneration process is reduced because only part of the absorbent, the gas-rich phase, needs to be regenerated, while the separated first gas-lean phase can immediately be recycled for reuse in the absorption unit. In yet another aspect of the present invention, the energy to be expended for the deacidization process is further reduced by incorporating two or more of the units used in the process in a single tower, so that the various phases can be transferred between some of the units by gravity, instead of pumping. The use of multiple units in a single tower is enabled and becomes practical, because of the relatively smaller size of the gas-rich phase that needs to be regenerated. In a conventional liquid-gas separation process, the volume of the gas-rich absorbent that needs to be regenerated is significantly larger than that of the gas-rich phase according to embodiments of the present invention. Thus, in the conventional methods, a single tower containing the absorption unit and the regeneration unit would be too tall to be practical.

FIG. 1 illustrates a particular embodiment of the present invention. Referring now to FIG. 1, a gaseous mixture 1 containing an acid gas to be removed and an absorbent 3 are provided into an absorption unit 10. The gaseous mixture 1 and the absorbent 3 contact with each other in the absorption unit 10. The acid gas to be removed can be, for example, $CO_2$, $SO_2$, $H_2S$, COS, $C_2S$, mercaptans, fluorides, HCl, or a combination thereof. The purified gaseous mixture 2, with the acid gas being removed, is released from the absorption unit 10 and can be collected or disposed of, depending on the user's purpose.

The absorption unit 10 according to embodiments of the present invention can be, for example, an absorption column or a membrane contractor, or any other absorption units that are known to those skilled in the art. The absorbent comprises a carrier phase and an organic phase that is immiscible with the carrier phase. It is readily appreciated by those skilled in the art that the absorbent can comprise two or more phases. For example, the absorbent can be biphasic containing the organic phase and an immiscible aqueous solution as the carrier phase. The absorbent can also be multiphasic containing the organic phase, and an immiscible aqueous solution and a solid phase as the carrier phase, wherein the solid phase is formed when the acid gas is absorbed in the organic phase and/or when the absorbed acid gas is transferred to the aqueous solution.

The carrier phase can be, for example, an aqueous phase or a hydrophilic phase. The carrier phase can comprise one or more aqueous solutions of a salt, including, but not limited to, alkaline salt solutions, ammonium salt solutions, alkanolamine salt solutions, alkaline-earth salt solutions. The carrier phase can also simply be water. The carrier phase can also comprise one or more salts in solid phase, including, but not limited to, alkaline salts, ammonium salts, alkanolamine salts, and alkaline-earth salts.

The organic phase can comprise one or more components, including, but not limited to, alkanes, unsaturated hydrocarbons, alcohols, glycols, ethers, aldehydes, ketones, carbohydrates, amines, and alkanolamines, amino acids. In a preferred embodiment, the alcohol comprises a $C_8$ to $C_{12}$ alcohol. In an embodiment of the present invention, the organic phase comprises an amine solution, including, but not limited to an alcohol, glycol or glycol ether solution of monoethanolamine, diethanolamine, piperizine, dibutylamine, or diisopropylamine. The concentration of the amine in the solution is about 0.1% to 99.99% (by volume).

In an embodiment of the present application, the ratio of the carrier phase to the organic phase in the absorbent is 10000:1 to 1:10000. Exemplary ratio of the carrier phase to the organic phase includes, but is not limited to, 10000:1, 1000:1, 100:1, 10:1, 5:1, 1:1, 1:2, 1:4, 1:10, 1:50, 1:100, 1:1000 or 1:10000.

The organic phase serves as a transfer medium that absorbs the acid gas and then transfers the absorbed acid gas to the carrier phase. According to embodiments of the present invention, when the acid gas contacts with the organic phase, the acid gas can be absorbed by the organic phase physically, chemically, or both physically and chemically, through the interface between the gaseous mixture and the organic phase. Physical absorption occurs when the acid gas is soluble in the organic phase, but is not susceptible to reacting chemically with any component in the organic phase. During physical absorption, the acid gas dissolves physically in the organic phase without being chemically modified by reacting chemically with any component therein. The amount of acid gas absorbed physically by the organic phase is determined by the vapor-liquid equilibrium of the mixture. Chemical absorption occurs when the absorbed acid gas is chemically modified by reacting chemically with one or more active components in the organic phase to form one or more reaction products. The amount of acid gas absorbed chemically by the organic phase is determined by the reaction between the acid gas and the one or more active components in the organic phase.

Utilization of an organic phase in the absorption unit 10 increases the absorption rate of the process, because the acid gas is absorbed into the absorbent at a rate greater than if it were directly absorbed by the carrier phase. Depending on whether the organic phase absorbs the acid gas physically or chemically, the absorbed acid gas can be chemically unmodified or modified, respectively.

The absorbed gas is then transferred into the carrier phase through the interface between the organic phase and the carrier phase, with or without further chemical modification.

In one embodiment of the present invention, the absorbed acid gas is transferred into the carrier phase by physical absorption, but is not susceptible to reacting chemically with any component in the carrier phase. The absorbed acid gas dissolves physically in the carrier phase without being chemically modified by reacting chemically with any component of the carrier phase. In another embodiment of the present invention, the absorbed acid gas is transferred to the carrier phase by reacting chemically with one or more active components in the carrier phase to form one or more reaction products. In still another embodiment of the present invention, the absorbed acid gas is transferred to the carrier phase both physically and chemically, through the interface between the organic phase and the carrier phase. The absorbed acid gas accumulates in the carrier phase until the carrier phase is saturated or the user terminates the absorption process.

Referring to FIG. 1, after the absorption process is complete in the absorption unit 10, the gas-rich absorbent 5 is sent to a separation unit 20 so that the phases can be separated from each other. In FIG. 1, there is shown a gravity settler tank 20 for separating the first gas-lean phase 4 from the gas-rich phase 6. The separating step of the present invention can also be accomplished utilizing one or more other types of phase settlers or phase separation units known in the art as suited for separation of bulk liquid phases. Some examples include simple settlers, filtration, centrifugation, membrane, etc.

The separated first gas-lean phase 4 comprises most or all components of the organic phase and little or none of the absorbed acid gas. The separated first gas-lean phase 4 is cycled back into the absorption unit 10 for reuse, with or without further treatment.

The separated gas-rich phase 6 contains most or all components of the carrier phase and the absorbed acid gas. The separated gas-rich phase 6 can also contain one or more components of the organic phase. The separated gas-rich phase 6 is subject to regeneration.

Referring to FIG. 1, the separated gas-rich phase 6 is routed to a regeneration unit 30, where the gas-rich phase 6 is treated to separate the absorbed acid gas 12 from the rest of the gas-rich phase, which is regenerated as part of the second gas-lean phase 14. The absorbed acid gas 12 is further treated to separate the acid gas 18 from the rest 16, which contains one or more components of the organic phase and the carrier phase that react with the acid gas during the absorption of the acid gas and/or the transfer of the absorbed acid gas. The separated acid gas 18 can be disposed of or collected, depending on the user's purpose. The rest 16 is regenerated as part of the second gas-lean phase 14. The second gas-lean phase 14, which comprises most or all components of the carrier phase, is cycled back into the absorption unit 10 for reuse, with or without further treatment.

The regeneration process according to embodiments of the present invention can be accomplished by, for example, thermal decomposition, gas or steam stripping, distillation, treatment through a membrane contactor, pervaporization, and pressure differential treatment.

As shown in FIG. 1, the first gas-lean phase 4 from the separation unit 20 and the second gas-lean phase 14 from the regeneration unit 30 are mixed together in a mixer 40. The resulting absorbent 3 is then cycled back into the absorption unit 10 for reuse. According to other embodiments of the present invention, the first gas-lean phase 4 and the second gas-lean phase 14 can each be cycled back into the absorption unit 10 for reuse without being first mixed together.

Although not shown in FIG. 1, in view of the present disclosure, it is readily appreciated by those skilled in the art that, in addition to the cycled back components of the absorbent 3, additional one or more components of the absorbent 3 can be added to compensate for the loss of the one or more components during the deacidizing process.

In one embodiment of the present invention, the acid gas to be removed is $CO_2$. The organic phase comprises, for example, one or more components selected from the group consisting of monoethanolamine, diethanolamine, piperzine, dibutylamine, and diisopropylamine. In a preferred embodiment of the present invention, the organic phase comprises a $C_8$ to $C_{12}$ alcohol solution of the one or more components described herein. The carrier phase comprises, for example, one or more components selected from the group consisting of monoethanolamine salt, diethanolamine salt, piperizine salt, dibutylamine salt, diisopropylamine salt, potassium bicarbonate, potassium carbonate, and water. In an embodiment of the present invention, the carrier phase comprises an aqueous solution of the salt described herein. In another embodiment of the present invention, the carrier phase comprises the salts described herein in solid phase.

Figure 2:
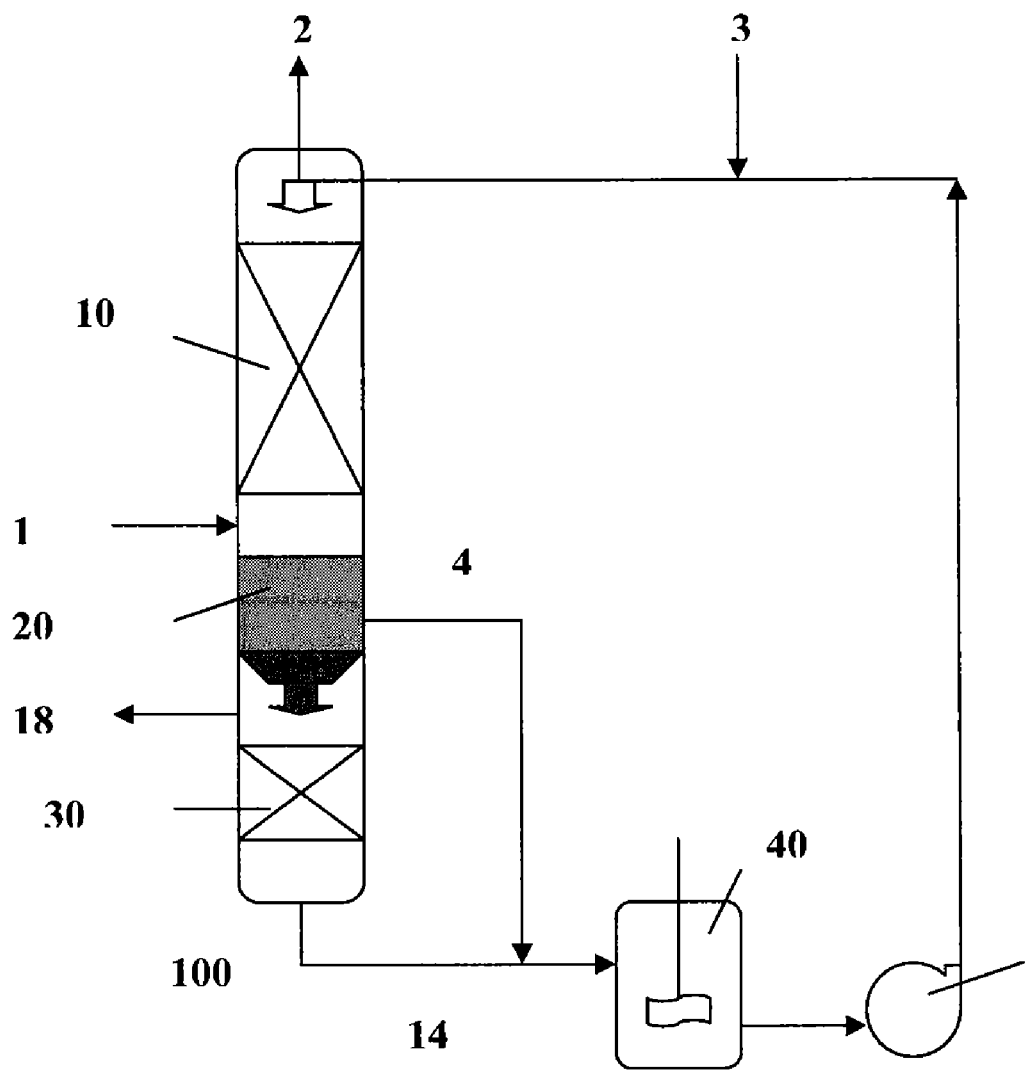
FIG. 2 is a flow diagram showing the steps of the deacidization process according to another embodiment of the present invention.

FIG. 2 illustrates another particular embodiment of the present invention. In this process, the absorption unit 10, separation unit 20 and regeneration unit 30 are grouped inside a single tower 100. The gas-rich absorbent from the absorption unit 10 flows downward into the separation unit 20 by gravity, so as to separate the gas-rich phase and the first gas-lean phase 4. After separation, the gas-rich phase flows downward into the regeneration unit 30, by gravity, where the regenerated acid gas 18 and the second gas-lean phase 14 are obtained. The first gas-lean phase 4 and the second gas-lean phase 14 further flow downward into the mixer 40, and are mixed in the mixer 40 to obtain the absorbent 3. The absorbent 3 is pumped back into the absorption unit 10, where it forms contact with the gaseous mixture 1, to start another cycle.

According to other embodiments of the present invention, the first gas-lean phase 4 and the second gas-lean phase 14 can each be pumped back into the absorption unit 10 for reuse without being first mixed together.

Again, in addition to the cycled back components of the absorbent 3, additional one or more components of the absorbent 3 can be added to compensate for the loss of the one or more components during the deacidizing process.

In this embodiment, no pumping energy is required for liquid transfer from the absorption unit 10 to the regeneration unit 30, thus achieves further energy saving.

The following examples illustrate the invention but are in no way intended to limit the scope of the present invention.

Example 1

An absorbent comprising two phases, an organic phase and a carrier phase, and a gaseous mixture containing carbon dioxide were supplied into a stirring cell absorption unit at about 25-45° C., 1 atm. The organic phase comprised 20% by volume of monoethanolamine and 80% by volume of decyl alcohol. The carrier phase comprised the reaction product of monoethanolamine and carbon dioxide.

When the organic phase contacted the gaseous mixture, carbon dioxide gas was chemically absorbed into the organic phase by reacting with monoethanolamine in the organic phase. The absorbed carbon dioxide existed as a reaction product formed between the absorbed carbon dioxide and monoethanolamine. The reaction product was then transferred through the interface between the organic phase and carrier phase into the carrier phase and accumulated there.

After absorption of the carbon dioxide gas, the absorbent was settled and separated by gravity into a first gas-lean phase and a gas-rich phase. The first gas-lean phase, comprising the unreacted monoethanolamine and decyl alcohol, was cycled back into the absorption unit for reuse.

The gas-rich phase, comprising the reaction product of monoethanolamine and carbon dioxide was sent to a regeneration unit. The regeneration process was conducted by thermal decomposition. The regeneration process resulted in the separation of carbon dioxide a second gas-lean phase, which comprises the separated monoethanolamine and any reaction product that was not separated during the regeneration process.

The carbon dioxide released from the regeneration process was collected. The second gas-lean phase was cycled back into the absorption unit for reuse.

Example 2

An absorbent comprising two liquid phases, an organic phase and a carrier phase, and a gaseous mixture containing carbon dioxide were supplied into a stirring cell absorption unit at about 25-45° C., 1 atm. The organic phase comprised 20% by volume of dibutylamine and 80% by volume of isooctanol. The carrier phase comprised an aqueous solution of 150 g/l of potassium carbonate.

When the organic phase contacted the gaseous mixture, carbon dioxide gas was chemically absorbed into the organic phase by reacting with dibutylamine in the organic phase. The absorbed carbon dioxide existed as a reaction product formed between the absorbed carbon dioxide and dibutylamine. The reaction product was then transferred through the interface between the organic phase and carrier phase into the carrier phase by further reacting with potassium carbonate in the carrier phase to form potassium bicarbonate. Thus, the absorbed carbon dioxide ultimately existed as potassium bicarbonate in the carrier phase.

After absorption of the carbon dioxide gas, the absorbent was settled and separated by gravity into a first gas-lean phase and a gas-rich phase. The first gas-lean phase, comprising the dibutylamine unreacted with carbon dioxide, dibutylamine released from the reaction product of the absorbed carbon dioxide and dibutylamine after the reaction product reacts with potassium carbonate, isooctanol, and maybe one or more additional components, is cycled back into the absorption unit for reuse.

The gas-rich aqueous phase, comprising potassium bicarbonate and the unreacted potassium carbonate, is sent to a regeneration unit. The regeneration process is conducted by thermal decomposition or gas stripping. The regeneration process separates carbon dioxide and potassium carbonate from potassium bicarbonate, resulting in a second gas-lean phase, which comprises an aqueous solution of potassium carbonate.

The carbon dioxide released from the regeneration process is collected. The second gas-lean phase is cycled back into the absorption unit for reuse.

Example 3

An absorbent comprising two liquid phases, an organic phase and a carrier phase, and a gaseous mixture containing carbon dioxide were supplied into a stirring cell absorption unit at about 25 to 45° C., 1 atm. The organic phase comprised 20% by volume of dibutylamine and 80% by volume of isooctanol. The carrier phase was a water solution.

When the organic phase contacted the gaseous mixture, carbon dioxide gas was chemically absorbed into the organic phase by reacting with dibutyl amine in the organic phase. The absorbed carbon dioxide existed as a reaction product formed between the absorbed carbon dioxide and dibutylamine. The reaction product was then transferred through the interface between the organic phase and carrier phase into the carrier phase and accumulated there.

After absorption of the carbon dioxide gas, the absorbent was settled and separated by gravity into a first gas-lean phase and a gas-rich phase. The first gas-lean phase, comprising the unreacted dibutylamine, isooctanol, and maybe one or more additional components, is cycled back into the absorption unit for reuse.

The gas-rich aqueous phase, comprising the reaction product formed between the absorbed carbon dioxide and dibutylamine, is sent to a regeneration unit. The regeneration process is conducted by thermal decomposition or gas stripping.

The regeneration process separates carbon dioxide and dibutylamine from the reaction product, resulting in a second gas-lean phase, which comprises the separated dibutylamine.

The carbon dioxide released from the regeneration process is collected. The second gas-lean phase is cycled back into the absorption unit for reuse.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for deacidizing a gaseous mixture comprising an acid gas, the process comprising:
   contacting the gaseous mixture with an absorbent in an absorption unit, wherein the absorbent comprises a carrier phase and an organic phase that is immiscible with the carrier phase;
   allowing the organic phase to absorb the acid gas and convert the acid gas into an absorbed acid gas, so as to convert the absorbent into a gas-rich absorbent and to convert the gaseous mixture into a purified gaseous mixture;
   allowing the absorbed acid gas to be transferred into the carrier phase, so as to form a first gas-lean phase and a gas-rich phase in the gas-rich absorbent;

providing the gas-rich absorbent to a separation unit, so as to separate the first gas-lean phase from the gas-rich phase;

cycling the separated first gas-lean phase back into the absorption unit;

providing the separated gas-rich phase to a regeneration unit, so as to obtain the acid gas and a second gas-lean phase; and cycling the second gas-lean phase back into the absorption unit.

2. The method of claim 1, wherein the organic phase comprises a component selected from the group consisting of an alkane, an unsaturated hydrocarbon, an alcohol, a glycol, an ether, an aldehyde, a ketone, a carbohydrate, an amine, an alkanolamine, and an amino acid.

3. The method of claim 2, wherein the alcohol comprises a $C_8$ to $C_{12}$ alcohol.

4. The method of claim 1, wherein the carrier phase is hydrophilic.

5. The method of claim 1, wherein the carrier phase comprises an aqueous phase.

6. The method of claim 1, wherein the carrier phase comprises a component selected from the group consisting of an amine salt, an ammonium salt, an alkanolamine salt, an alkaline salt, an alkaline-earth salt, an amino acid salt, and water.

7. The method of claim 1, wherein the volume ratio of the carrier phase to the organic phase is about 10000:1 to about 1:10000.

8. The method of claim 7, wherein the volume ratio is about 50:1 to about 1:50.

9. The method of claim 1, wherein the gas-rich phase is regenerated by a process selected from the group consisting of thermal decomposition, gas stripping, steam stripping, distillation, treatment through a membrane contractor, pervaporization, pressure differential treatment, and a combination thereof.

10. The method of claim 1, wherein the acid gas is selected from the group consisting of $CO_2$, $SO_2$, $H_2S$, COS, $C_2S$, mercaptans, fluorides, and HCl.

11. The method of claim 10, wherein the acid gas is $CO_2$.

12. The method of claim 11, wherein the organic phase comprises a component selected from the group consisting of monoethanolamine, diethanolamine, piperizine, dibutylamine, and diisopropylamine, wherein the component is dissolved in at least one of a glycol, a glycol ether and a $C_8$-$C_{12}$ alcohol.

13. The method of claim 11, wherein the carrier phase comprises a component selected from the group consisting of a monoethanolamine salt, a diethanolamine salt, a piperizine salt, a dibutylamine salt, a diisopropylamine salt, a potassium bicarbonate, and a potassium carbonate.

14. The method of claim 11, wherein the absorbent comprises a pair of the organic phase and the carrier phase selected from the group consisting of:

(1) a solution of monoethanolamine in at least one of an alcohol and a glycol, a glycol ether, and one or more reaction products of monoethanolamine and CO2;

(2) a solution of monoethanolamine in at least one of an alcohol, a glycol ether and a glycol, and an aqueous solution of one or more reaction products of monoethanolamine and CO2;

(3) a solution of diethanolamine in at least one of an alcohol, a glycol ether and a glycol, and one or more reaction products of diethanolamine and CO2;

(4) a solution of diethanolamine in at least one of an alcohol, a glycol ether and a glycol, and an aqueous solution of one or more reaction products of diethanolamine and CO2;

(5) a solution of piperizine in at least one of an alcohol, a glycol ether and a glycol, and one or more reaction products of piperizine and CO2;

(6) a solution of piperizine in at least one of an alcohol, a glycol ether and a glycol, and an aqueous solution of one or more reaction products of piperizine and CO2;

(7) a solution of dibutylamine in at least one of an alcohol, a glycol ether and a glycol, and one or more reaction products of dibutylamine and CO2;

(8) a solution of dibutylamine in at least one of an alcohol, a glycol ether and a glycol, and an aqueous solution of one or more reaction products of dibutylamine and CO2;

(9) a solution of dibutylamine in at least one of an alcohol, a glycol ether and a glycol, and an aqueous solution of potassium carbonate;

(10) a solution of diisopropylamine in at least one of an alcohol, a glycol ether and a glycol, and one or more reaction products of diisopropylamine and CO2;

(11) a solution of diisopropylamine in at least one of an alcohol, a glycol ether and a glycol, and an aqueous solution of one or more reaction products of diisopropylamine and CO2; and

(12) a solution of diisopropylamine in at least one of an alcohol, a glycol ether and a glycol, and an aqueous solution of potassium carbonate.

15. The method of claim 1, wherein the organic phase absorbs the acid gas physically.

16. The method of claim 1, wherein the organic phase absorbs the acid gas chemically.

17. The method of claim 1, wherein the first gas-lean phase and the second gas-lean phase are mixed together before they are cycled back into the absorption unit.

18. The method of claim 1, wherein the gas-rich absorbent is provided to the separation unit before, after, or simultaneously with the transfer of the absorbed acid gas into the carrier phase, thus the formation of the first gas-lean phase and the gas-rich phase.

19. The method of claim 1, wherein the gas-rich absorbent moves downward from the absorption unit to the separation unit by gravity.

20. The method of claim 1, wherein the separated gas-rich phase moves downward from the separation unit to the regeneration unit by gravity.

21. The method of claim 1, wherein the gas-rich absorbent moves downward from the absorption unit to the separation unit by gravity, and the separated gas-rich phase moves downward from the separation unit to the regeneration unit by gravity.

* * * * *